United States Patent [19]

Guerrero Q.

[11] 4,434,568
[45] Mar. 6, 1984

[54] GRAPHIC DISPLAY ASSEMBLY FOR DYNAMIC PROGRAM PRESENTATION

[76] Inventor: Emilio C. Guerrero Q., Av. Francisco Miranda (California Norte) Centro Comercial Puerta del Este Local 16-B, Caracas, Venezuela

[21] Appl. No.: 312,121

[22] Filed: Oct. 16, 1981

Related U.S. Application Data

[63] Continuation-in-part of Ser. No. 74,830, Sep. 12, 1979, abandoned.

[51] Int. Cl.$^3$ ............................................. G09F 11/12
[52] U.S. Cl. ........................................ 40/518; 40/524; 40/472
[58] Field of Search .......... 40/524, 472, 518, 519–523, 40/526–528

[56] References Cited

U.S. PATENT DOCUMENTS

| | | | |
|---|---|---|---|
| 1,611,538 | 12/1926 | Landman | 40/518 |
| 2,010,501 | 8/1935 | Stephens | 40/518 |
| 2,097,835 | 3/1936 | Epps | 40/518 |
| 2,167,518 | 7/1939 | Lins | 40/518 |
| 2,192,257 | 3/1940 | Champion et al. | 40/525 |
| 2,506,586 | 5/1950 | Erisman | 40/472 |
| 3,359,666 | 12/1967 | Steward | 40/472 |
| 3,594,926 | 7/1971 | Reed | 40/472 |
| 3,653,137 | 4/1972 | Hansen | 40/525 |
| 4,002,401 | 1/1977 | Malberg | 40/518 |
| 4,104,810 | 8/1978 | Mirman | 40/518 |

FOREIGN PATENT DOCUMENTS

| | | | |
|---|---|---|---|
| 223828 | 8/1959 | Australia | 40/518 |
| 224351 | 11/1962 | Austria | 40/518 |

Primary Examiner—Gene Mancene
Assistant Examiner—James Hakomaki
Attorney, Agent, or Firm—Dennison, Meserole, Pollack & Scheiner

[57] ABSTRACT

A graphic display assembly comprising a program-carrying endless belt mounted between opposed shafts for travel thereabout in conjunction with rotation of at least one of the shafts. Multiple endless transparent tapes, with representation thereon coordinated to the program on the belt, overly the belt. The tapes mount on a pair of shafts, each respectively outward of the belt-mounting shafts. Drive means effect a selective movement of the belt and the tapes simultaneously, or the belt independently of the tapes. The utilization of individual reels to mount the individual tapes also enables a selective movement of the individual tapes with respect to each other and the belt to provide for further variation in the graphic display of the assembly.

10 Claims, 11 Drawing Figures

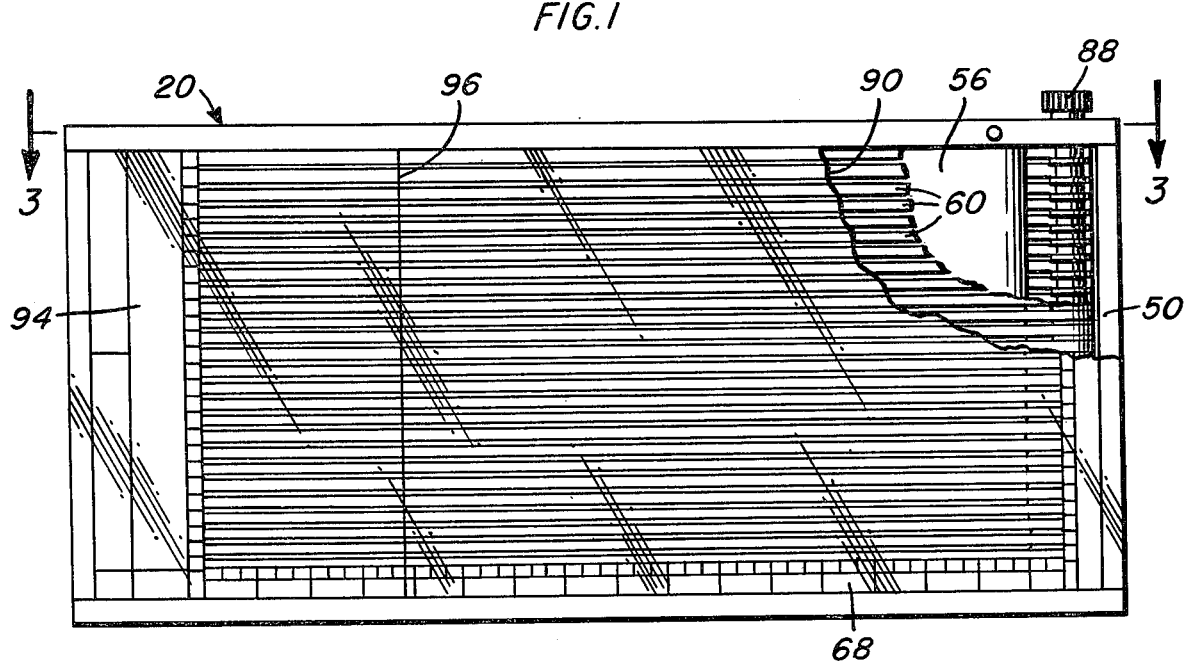
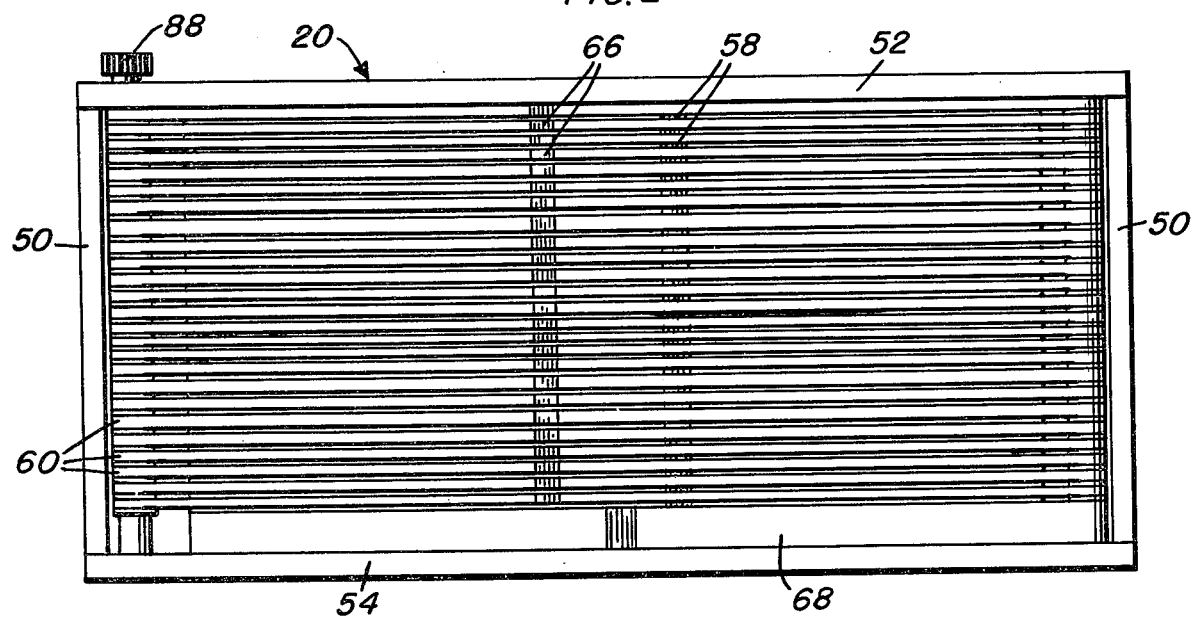
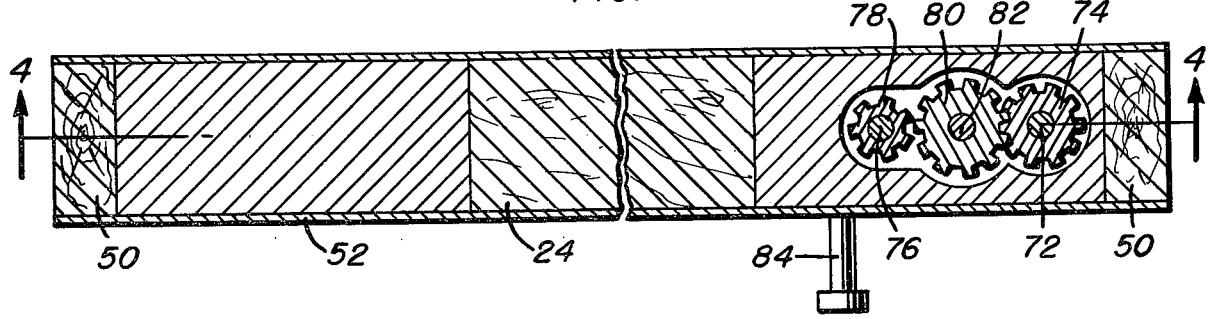

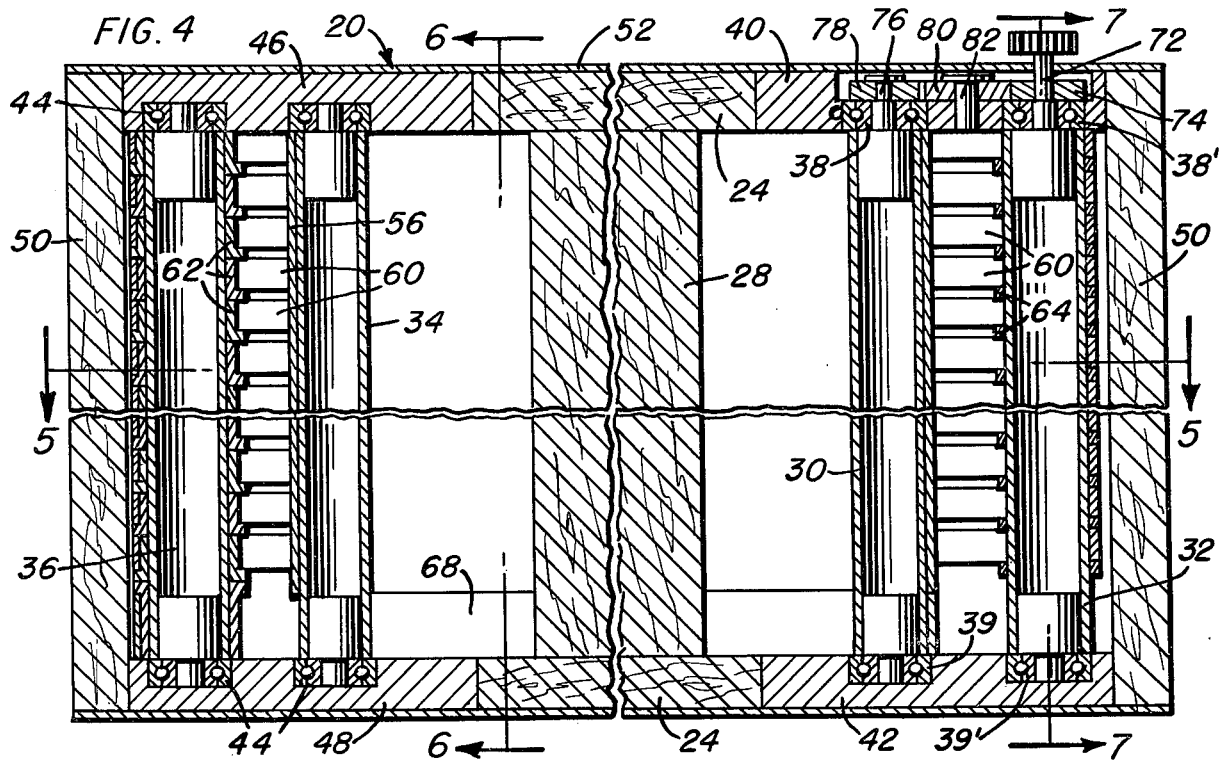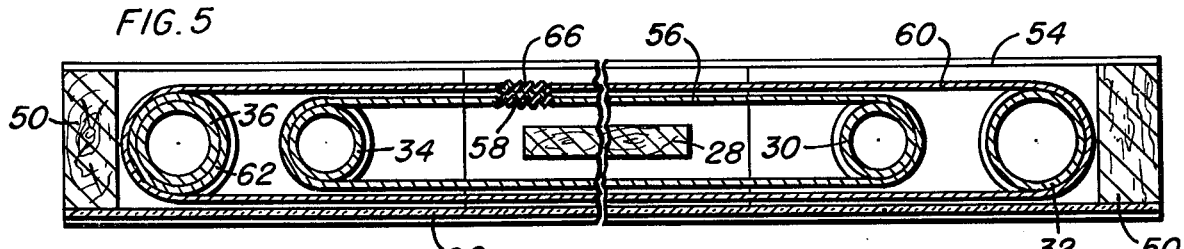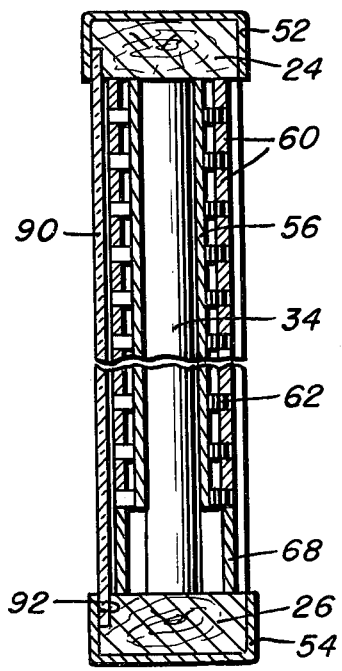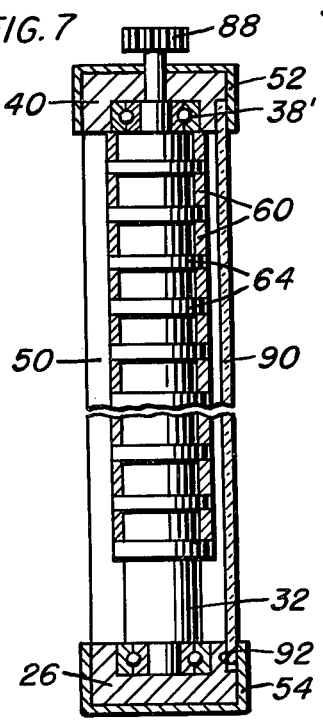

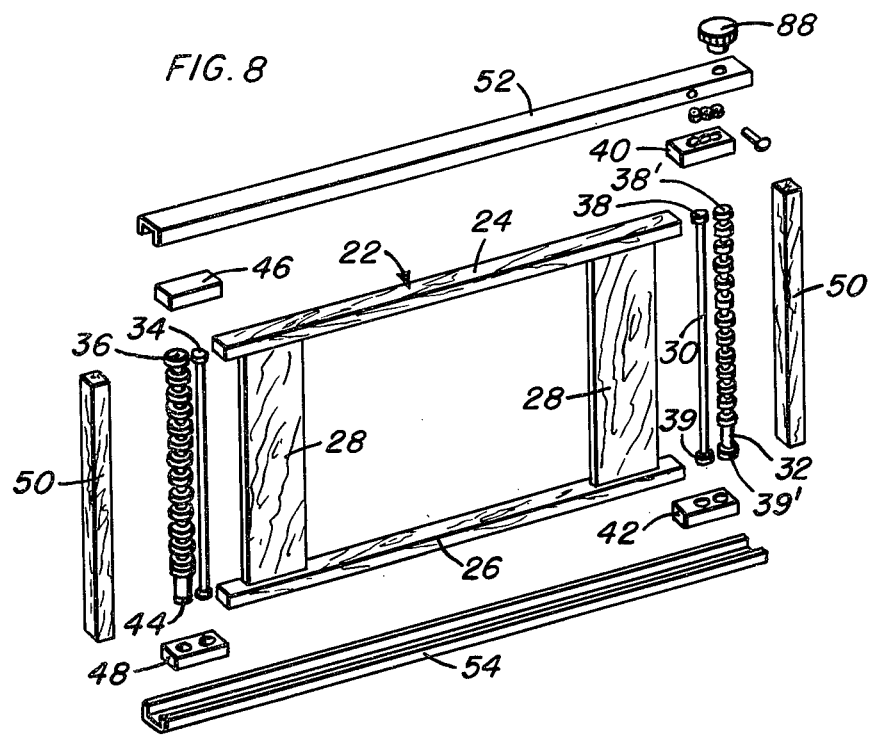
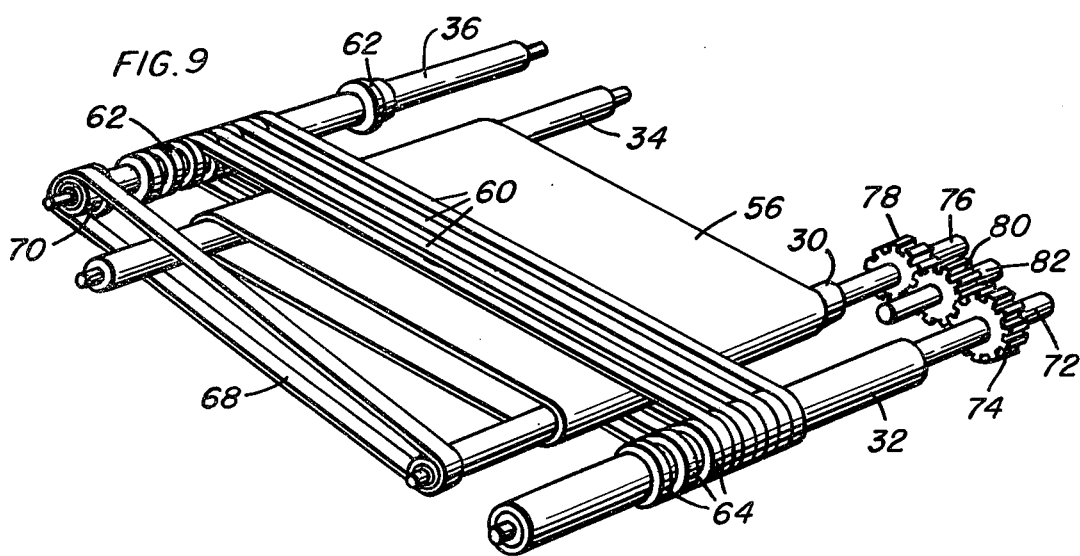
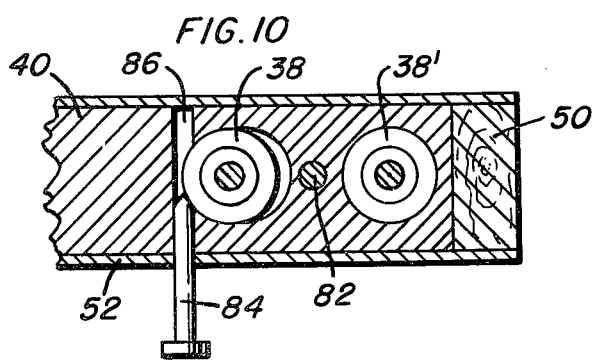
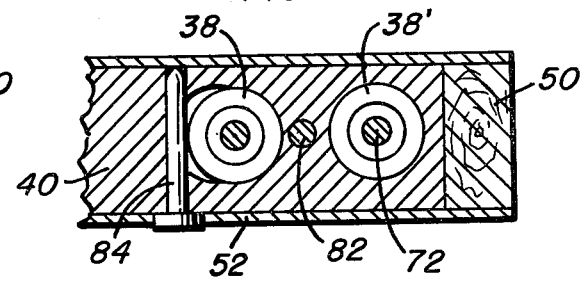

GRAPHIC DISPLAY ASSEMBLY FOR DYNAMIC PROGRAM PRESENTATION

RELATED APPLICATIONS

This is a continuation-in-part application of co-pending application Ser. No. 074,830, filed Sept. 12, 1979, now abandoned.

BACKGROUND OF THE INVENTION

Diverse systems, including display boards, panels, and the like, exist for the expression, in graphic form, of a wide variety of programs involving any number of activities relating to substantially any field of endeavor, including industrial activities, construction, science, politics, and the like.

The graphic representation of such activities normally find expression in static diagrams which, while graphically demonstrating a program or activity, cannot provide for an instantaneous updating in accordance with rapidly changing conditions. Consequently, changing situations have normally heretofore involved rediagramming, the formation of new graphics, and the like which update and reflect the situation of the moment. This can involve substantial cost and a considerable amount of time, particularly if all further adjustments, projections, and situation changes, are to be continually accommodated.

SUMMARY OF THE INVENTION

The assembly of the present invention specifically provides for the graphic presentation of a fixed representation of a program in conjunction with means for dynamically and instantaneously accommodating program changes in conjunction with and relative to the fixed program representation without the destruction of the fixed representation or the formation of new graphic diagrams, charts, and the like.

Basically, the assembly of the present invention incorporates a first wide endless belt upon which is presented the basic program as a fixed representation. This belt engages about a pair of laterally spaced parallel shafts which are selectively rotated for movement of the program representation as desired across the assembly or display board.

Overlying the fixed representation belt are a series of individual tapes, the combined width of which generally correspond to that of the belt, or at least that portion of the belt containing the fixed representation of the program. The tapes are transparent to allow for a viewing therethrough of the fixed program. The tapes include representations thereon coordinated to the fixed representation on the belt therebelow. The tapes are endless and mounted on a pair of elongated shafts paralleling the first pair of shafts and respectively located outward thereof in a manner whereby the tapes are adapted to travel about and relative to the belt. One of the shafts mounting the tapes includes a series of independent reels, each receiving a tape. The second tape mounting shaft includes multiple dividers, corresponding to the location of the reels, to maintain tape separation. The tapes, mounted in this manner, can be adjusted as a unit, either in conjunction with an adjustment of the belt through an intermeshing drive arrangement, or, as a unit relative to the belt. In addition, the tapes can be adjusted individually both relative to the remaining tapes and relative to the belt through a manipulation of the corresponding reel or reels independently of the reel mounting shaft. An appropriate calendar tape engages about a separate reel on the reel shaft and the remote shaft associated with the belt whereby adjustment of the fixed representation belt will normally have a coordinated adjustment of the calendar. However, independent adjustment of the calendar relative to the belt is also possible. A drive system for the shafts is provided wherein the tape mounting shaft incorporating the fixed spacers is directly manually driven. A coordinated driving of the belt is achieved through a gear train which is selectively engaged by a slight shifting of one of the belt mounting shafts.

Additional objects and advantages will become apparent from the details of construction and the manner of use as more fully hereinafter described and claimed.

BRIEF DESCRIPTION OF THE DRAWINGS

FIG. 1 is a front elevational view of the display assembly with portions thereof broken away for purposes of illustration;

FIG. 2 is a rear view of the display assembly;

FIG. 3 is an enlarged partial sectional view taken substantially on a plane passing along line 3—3 in FIG. 1;

FIG. 4 is a cross-sectional detail taken substantially on a plane passing along line 4—4 in FIG. 3;

FIG. 5 is a cross-sectional detail taken substantially on a plane passing along line 5—5 in FIG. 4;

FIG. 6 is a vertical cross-sectional detail taken substantially on a plane passing along line 6—6 in FIG. 4;

FIG. 7 is a vertical cross-sectional detail taken substantially on a plane passing along line 7—7 in FIG. 4;

FIG. 8 is an exploded schematic perspective view of several major components of the assembly with the belt and tapes removed;

FIG. 9 is a perspective schematic view illustrating the general relationship between the shafts, belt and tapes;

FIG. 10 is a cross-sectional detail illustrating the means for selectively engaging a belt shaft with the driven tape shaft for a synchronized driving thereof, the shafts in FIG. 10 being disengaged; and FIG. 11 is a view similar to FIG. 10 wherein the engaged position is presented.

DESCRIPTION OF THE PREFERRED EMBODIMENT

Referring now more specifically to the drawings, the display assembly of the present invention is in the nature of a display board or panel, generally designated by reference numeral 20, which incorporates both an endless belt for the presentation of a base or fixed program, and multiple adjustable tapes incorporating representations complimenting the fixed program and providing for a dynamic adjustment of the graphic presentation of the program.

The panel includes an elongated rigid framework 22 comprising upper and lower laterally spaced parallel bars 24 and 26. The bars 24 and 26 are rigidly interconnected by a pair of flat rigid vertical members 28 extending between and rigidly affixed to the upper and lower bars 24 and 26.

A first pair of inner and outer elongated vertical shafts 30 and 32 are positioned immediately outward of one end of the framework 22 in laterally spaced relation to each other and in the general plane of the framework. A second pair of generally similar inner and outer shafts 34 and 36 are provided outward of the opposed end of the framework 22.

The shafts 30 and 32 have the upper ends thereof respectively mounted, by appropriate bearing assemblies 38 and 38', in upper bearing block 40, and the lower ends thereof mounted by bearing assemblies 39 and 39' in the lower bearing block 42.

The upper and lower ends of the shafts 34 and 36 are similarly mounted, through appropriate bearing elements 44, in upper and lower bearing blocks 46 and 48. The bearing blocks are preferably of a cross-sectional configuration which corresponds to that of the upper and lower bars 24 and 26, in the assembled panel, abut against the corresponding ends of the bars and define continuations thereof. Vertical structural members 50 extend between and are affixed to the outer ends of the aligned upper and lower blocks 40, 42 and 46, 48. Formed in this manner, it will be appreciated that the rails 22 and 26, the blocks 40, 42, 46 and 48, and the vertical structural members 50 define a rigid rectangular frame with all of the components interconnected or secured together in any appropriate manner.

As noted in the drawings, it is contemplated that a first U-shaped rail 52 overly and enclose the upper bar 24, the bearing blocks 40 and 46 at the opposed ends thereof, and the upper ends of the two side structural members 50. A similar, upwardly directed, U-shaped rail 54 receives and encloses the lower bar 26, the opposed lower bearing blocks 42 and 48, and the lower ends of the two vertical structural members 50. In each instance, the rail, 52 or 54, can be used to interlock the various received components into a rigid assembly.

The inner shafts 30 and 34 mount an endless belt 56 for travel thereabout, the belt 56 being of a width only slightly less than the height of the shaft between the upper and lower bars 24 and 26. As will be appreciated from the drawings, the belt encloses the vertical framework stabilizing members 28. It is contemplated that the belt, preferably along the inner run or section thereof, incorporate a spring-like or resilient section 58 which maintains a constant degree of tension on the belt 56 to ensure a proper driving engagement with the shafts 30 and 34.

A series of individual endless tapes 60 engage about the outer shafts 32 and 36, overlying the belt 56 along both runs thereof. The tapes are coplanar, closely adjacent and generally coextensive with the belt 56 along the full length thereof.

The actual mounting of the tapes 60 on the shaft 36 is effected by a series of enlarged reels or spools 62 rotatably received on the shaft 36, one reel for each tape. Appropriate means is provided for the retention of each tape on its corresponding spool, preferably the provision of cooperating enlarged end flanges on the spools. The opposite tape-receiving shaft 32 includes annular spaced dividers 64 therealong for reception of the tapes therebetween, thereby maintaining the appropriate tape orientation throughout the travel of the tapes, either as a unit or individually, as shall be explained subsequently.

As with the belt 56, each of the tapes 60 has a tensioning device 66, for example a spring or elastomeric member, incorporated therein to maintain a proper driving engagement of the tapes with the shafts and reels. The tapes 60, in order to allow for a viewing of the belt 56 therebeneath, will be transparent.

Located immediately below the belt 56 and the multiple tapes 60 is an endless calendar tape 68. The calendar tape engages about a freely rotating reel 70 on the spool 36 and about the opposed inner shaft 30. As deemed necessary, an appropriate tensioning devce can also be incorporated in the calendar tape 68. Oriented about the shaft 30 and shaft mounted reel 70, it will be appreciated the calendar tape is adjustable both in conjunction with the belt 56 and relative thereto, and also as desired, relative to the multiple tapes 60.

The control assembly for the rotation of the driving shafts 30 and 32, and hence the belt and tapes, is associated with the upper bearing block 40. The bearing assembly 38', associated with the upper end of the shaft 32, is mounted in fixed position within the bearing block 40 and rotatably receives the projecting reduced diameter axle 72 of the shaft 32 therethrough. The axle 72, above the bearing assembly 38', has a drive gear 74 fixed thereto.

The upwardly projecting reduced diameter axle 76, of the shaft 30, is received through and rotatably mounted by the upper bearing assembly 38 which is mounted within the bearing block for a lateral shifting thereof toward and away from the fixed position bearing assembly 38'. This movement is relatively slight and accommodated either by a slight flexure of the shaft 30 or by a minimal pivotal movement of the lower end of the shaft 30 within its bearing assembly. The tension in belt 56 acts to resiliently maintain the shaft 30 away from the shaft 32 until physically shifted.

The axle 76 projects above the corresponding bearing assembly 38 and has a driven gear 78 fixed thereto. Intermediate the gears 74 and 78 is an idler gear 80 mounted, within the bearing block 40 and coplanar with the gears 74 and 78, by a short axle 82. The idler gear 80 is in constant meshed or driven engagement with the gear 74. The gear 78, fixed to the shaft 30 for a selective driving thereof, is normally maintained out of driving engagement with the idler gear 80 by action of the tension inherent within the program belt 56. Engagement of the driven gear 78 with the idler gear 80 is effected by a lateral shifting of the upper end of the shaft 30, and more particularly the associated bearing assembly 38, by the insertion of a transversely directed caming pin 84 engaged through the bearing block 40 and the associated portion of the rail 52 thereover. An appropriate bore 86, aligned with a side portion of the arcuate periphery of the bearing assembly 38, is provided for an accommodation of the pin 84. As will be appreciated from FIGS. 3, 4, 10 and 11, introduction of the pin engages an arcuate edge portion of the periphery of the bearing assembly 38 and effects a lateral shifting thereof sufficient to mesh the driven gear 78 with the idler gear 80. The retention of the pin 84 within the bore 86 fixes the gears in driving engagement with each other until such time as the pin is removed. If deemed advisable, an appropriate head can be provided on the pin 84 to facilitate the insertion and removal thereof. Manipulation of the control assembly is conveniently effected through an enlarged control knob 88 fixed to the outer end of the axle 72 associated with the shaft 32, the knob 88 being oriented in an easily accessible position immediately above the top rail 52.

Assembled in the above manner, it will be appreciated that the panel 20 provides a high degree of versility in the graphic presentation of programs and the dynamic representation of changes, modifications, variations, and the like therein. In connection therewith, and in accordance with a preferred manner of use of the panel, an original program will be provided as a fixed representation on the belt 56. A similar representation, of the same program or a coordinated program, or coordinated material, will be provided on the transparent overlying tapes 60 which, in effect, define a floating program. Finally, a calendar, or the like, is provided on the calendar tape 68 and provides a time reference for the program involved.

In use, the device provides for the simultaneous forward and/or rearward movement of the original program, the associated floating or complimentary program, and the calendar, to provide for a display of any portion of the program appearing along the continuous length of the belt and tapes. This is effected by an engagement of the driven gear 78, associated with the shaft 30, with the idler gear 80 whereby upon a manipulation of the control knob 88, the shafts 32 and 30 are both rotated in conjunction with each other and a coordinated movement of the belt 56 and the overlying coplanar array of tapes 60 is effected. Should it become necessary to adjust the floating program relative to the fixed program, the gear 78 is disengaged, whereby rotation of the shaft 32, by manipulation of the knob 88, effects a simultaneous movement of all of the tapes 60, and hence adjusts the floating program, as an entity, relative to the fixed program and the calendar. As will be appreciated, the calendar, in this arrangement, remains fixed relative to the original program. As another accommodation for encountered variations, the individual tapes 60 can be separately adjusted or manipulated by a manual rotating of the associated individual reels 62. These reels will normally be accessible from the rear of the panel. A similar independent adjustment of the calendar 68 can be effected by a manual rotation of the associated reel 70. In this manner, distinct changes in the program can be effected while maintaining the original program and presenting a visual display of the changes made therein. Incidentally, it is to be appreciated that while the tension in the individual tapes is such as to provide for a common or unified rotation thereof in conjunction with a rotation of the shaft 32, individual movement of the tapes, by manipulation of the reels 62, is also readily achieved with the tapes sliding about the shaft 32 between the corresponding dividers 64.

From the foregoing, it will be appreciated that the panel incorporates a significant degree of versatility in graphically demonstrating a program by means of a static diagram or representation which can be instantaneously updated and/or modified, and the like, for the accommodation of changing situations. This is done in a manner which avoids total reprogramming or redrawing of the original representation, and allows for a ready retrieval of the original program as desired.

It is contemplated that the panel 20 be completed by the provision of a protective transparent overlying front plate 90 which sits within forwardly directed steps or shoulders 92 provided about the edges of the framework bars and members 24, 26 and 50. Retention of this front plate can be effected by the upper and lower rails 52 and 54, as suggested in FIGS. 6 and 7.

It is also contemplated that appropriate program explaining indicia, lists of activities, and the like be provided, preferably on the protected under surface of the plate 90, along one or both vertical edges thereof as suggested at 94. Further, one or more appropriately positioned alignment or guide lines 96 can be provided as desired on the front plate for assisting in the adjustment of the various representation forming elements, whether this be the belt, the tapes as a unit, or the individual tapes, including the calendar tape.

I claim:

1. A graphic representation assembly comprising a panel, a program carrying member mounted in said panel and presenting a fixed representation of a program, multiple movable coplanar tapes overlying said program carrying member and the fixed representation of a program, said tapes being transparent for a viewing of said fixed representation therethrough, said tapes including representations thereon coordinated to the fixed representation, means for moving said tapes relative to said program carrying member and said fixed representation and for varying the relationship between the representations on the tapes and the fixed representation to accommodate program changes, said means for moving the tapes relative to said fixed representation including first means for moving said tapes simultaneously, and second means for moving said tapes individually, a pair of laterally spaced rotatably mounted outer shafts, a first one of said outer shafts having multiple reels rotatably mounted thereon, each reel having one of said tapes extending thereabout, each of said tapes also extending about the second outer shaft, external control means for rotating said second outer shaft and the tapes thereon to define said first means for moving said tapes simultaneously, said reels being independently manually rotatable to define the second means for moving said tapes individually, and means for adjusting said program carrying member relative to the direction of movement of the tapes.

2. The structure of claim 1 wherein said means for adjusting said program carrying member includes a pair of inner shafts comprising first and second inner shafts paralleling said first and second outer shafts respectively immediately inward of said first and second outer shafts, said first and second inner shafts mounting said program carrying member, and means for selectively rotating said second inner shaft for adjustment of said program carrying member.

3. The structure of claim 2 wherein said means for selectively rotating said second inner shaft includes a gear train selectively engageable between said second outer and inner shafts for selective rotation of said second inner shaft in response to rotation of said second outer shaft, and means for disengaging said gear train for allowing rotation of said second outer shaft independent of said second inner shaft.

4. The structure of claim 3 including a calendar tape engaged both about a reel rotatably mounted on said first outer shaft and about said second inner shaft for selective movement of said calendar tape with said second inner shaft or independently thereof.

5. A graphic representation assembly comprising a panel, a program carrying member mounted in said panel and presenting a fixed representation of a program, multiple movable tapes overlying said program carrying member and the fixed representation of a program, said tapes being transparent for a viewing of said fixed representation therethrough, said tapes including representations thereon coordinated to the fixed representation, means for moving said tapes relative to said program carrying member and said fixed representation and for varying the relationship between the representations on the tapes and the fixed representation to accommodate program changes, said means for moving the tapes including a pair of laterally spaced rotatably mounted outer shafts, a first one of said outer shafts having multiple reels rotatably mounted thereon, each reel having one of said tapes extending thereabout, each of said tapes also extending about the second outer shaft, external control means for rotating said second outer shaft and the tapes thereon for moving said tapes simultaneously, said reels being independently manually rotatable for moving said tapes individually, first and second inner shafts paralleling said first and second outer shafts, respectively, immediately inward of said first and second outer shafts, said first and second inner shafts mounting said program carrying member, and means for selectively rotating said second inner shaft for adjustment of said program carrying member.

6. The structure of claim 5 wherein said tapes are substantially coplanar and parallel to said program carrying member.

7. The structure of claim 6 wherein said program carrying member is an endless belt of a width generally corresponding to the combined widths of said tapes, each of said tapes also being of endless construction.

8. The structure of claim 7 wherein said means for selectively rotating said second inner shaft includes a gear train selectively engageable between said second outer and inner shafts for selective rotation of said second inner shaft in response to rotation of said second outer shaft, and means for disengaging said gear train for allowing rotation of said second outer shaft independent of said second inner shaft.

9. The structure of claim 8 including a calendar tape engaged both about a reel rotatably mounted on said first outer shaft and about said second inner shaft for selective movement of said calendar tape with said second inner shaft or independently thereof.

10. The structure of claim 8 wherein said gear train includes a drive gear fixed to said second outer shaft, a driven gear fixed to said second inner shaft, an idler gear in constant driven engagement with said drive gear, said second inner shaft being mounted for lateral shifting toward and away from said second outer shaft for selective engagement of said driven gear with said idler gear.

* * * * *